United States Patent Office 3,308,155
Patented Mar. 7, 1967

3,308,155
PREPARATION OF 3,3-DISUBSTITUTED
CARBOXYLIC ACIDS
Allan J. Lundeen, Ponca City, Okla., assignor to Continental Oil Company, Ponca City, Okla., a corporation of Delaware
No Drawing. Filed Feb. 25, 1963, Ser. No. 260,846
8 Claims. (Cl. 260—540)

This invention relates to the preparation of 3,3-disubstituted carboxylic acids. In one aspect, the invention relates to a general method for preparing 3,3-disubstituted carboxylic acids in which the 3 position substituents are monovalent hydrocarbon radicals by reaction of a β-lactone with tri (monovalent hydrocarbon radical) aluminum. In another aspect, the invention relates to preparation of 3,3-disubstituted valeric acids by reaction of a β,β-disubstituted propiolactone with triethylaluminum.

Acids of the general type, 3,3-substituted carboxylic acids, in which two monovalent hydrocarbon radicals are attached to the γ or number 3 carbon atom of the acid are of considerable value because of the steric hindrance of the carboxyl group which is produced by the substituents in the 3 position. For example, esters of such a sterically hindered acid possess superior hydrolytic stability. Such esters can, for example, be used in formulation of synthetic lubricants and hydraulic fluids. However, acids of this type are very difficult to prepare, and, within my personal knowledge, no simple, general method for their preparation has to this date been devised. For example, a frequently employed method of preparing 3,3-disubstituted valeric acids is that involving the reaction of a tertiary Grignard reagent with ethylene oxide. The hydrocarbon portion of the Grignard reagent will, of course, correspond to the γ carbon and its associated substituents of the valeric acid to be produced. A complex magnesium salt is produced by the reaction which can then be hydrolyzed to the substituted amyl alcohol corresponding to the valeric acid desired. The alcohol is then oxidized to the acid.

Accordingly, it is an object of this invention to provide a method for preparation of 3,3-disubstituted carboxylic acids. It is another object of the invention to provide a general method for preparing 3,3-disubstituted carboxylic acids and/or their salts from relatively inexpensive reactants.

Other aspects, objects, and the several advantages of this invention will become apparent upon study of this disclosure and the appended claims.

According to the invention, I have found that trialkylaluminum reacts with a 3,3-disubstituted propiolactone to yield a dialkylaluminum salt of 3,3-disubstituted carboxylic acid according to the equation:

(1) 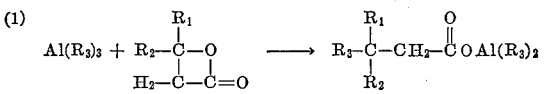

where $R_1$ and $R_2$ are monovalent hydrocarbon radicals of identical or differing structure, and $R_3$ is alkyl. The aluminum salt reaction product can then be hydrolyzed to the corresponding 3,3-disubstituted carboxylic acid.

The present invention provides a general method for easily and quickly preparing 3,3-disubstituted carboxylic acids utilizing relatively inexpensive and easily obtained reactants. The reaction possesses considerable advantage over previous types of carboxylic acid syntheses in that it is generally applicable to the preparation of any type of 3,3-disubstituted carboxylic acid in which the substituents of the γ or number 3 carbon of the acid are any type of monovalent hydrocarbon radicals. Moreover, the product produced in the initial reaction between the primary reactants can be directly hydrolyzed to the acid, instead of employing an intermediate hydrolysis to the alcohol, followed by oxidation to the acid.

Since 3,3-disubstituted propiolactones can, in general, be synthesized from a ketene and an appropriate carbonyl compound in accordance with the process of Gresham et al., as reported in the Journal of The American Chemical Society, volume 76, page 486 (1954), the reaction of these compounds with the trialkylaluminum provides a simple, general synthesis of 3,3-disubstituted carboxylic acids.

The following examples will serve to illustrate the preparation of typical 3,3-disubstituted carboxylic acids according to the process of the present invention.

EXAMPLE I

Toluene in the amount of 150 ml. and triethylaluminum in the amount of 15 ml. were placed in a dry 500-ml. flask. The flask was fitted with a dropping funnel containing 10.2 grams of 3-isovalerolactone (3,3-dimethyl propiolactone) and 100 ml. of toluene. The contents of the dropping funnel were added to the flask with stirring over a period of about seventy minutes, during which time the reaction mixture was maintained at −24° C. and ±2° C. At the outset of the reaction, the flask was flushed with dry nitrogen, and all subsequent operations were conducted under an inert atmosphere of dry nitrogen.

At the expiration of the seventy-minute addition period, the reaction mixture was hydrolyzed by the addition of 100 ml. of 30% sulfuric acid. The organic acid produced upon hydrolysis was isolated from the reaction mixture by extracting the solution with an aqueous potassium hydroxide solution. The aqueous potassium hydroxide solution was then acidified with dilute sulfuric acid to convert the potassium valerate to the valeric acid. The valeric acid thus obtained was completely removed from the aqueous phases by an ether extraction. The ether extractant was then removed by distillation under reduced pressure to yield 11.3 grams of product. Gas chromatographic analysis of this product, in addition to a neutralization equivalent determination indicated that the product was approximately 80.0% $C_7$ carboxylic acid. This yield of the $C_7$ acid amounted to 68% of theory. The $C_7$ acid was identified as 3,3-dimethyl valeric acid by conversion to its amide derivative (melting point, 77° C. to 78° C.), and to its anilide derivative (melting point, 101° C. to 102° C.).

EXAMPLE II

The procedure of Example I is followed, except that instead of 3-isovalerolactone, there is used about a stoichiometric amount of 3-phenyl-3-isopropyl propiolactone. Dilute hydrochloric acid is used for hydrolysis, and aqueous sodium hydroxide is used for extraction of the carboxylic acid as its salt. Acidification of the sodium salt solution and subsequent ethanol extraction produces 3-phenyl-3-isopropyl valeric acid.

EXAMPLE III

The procedure of Example II is followed, except that instead of 3-phenyl-3-isopropyl propiolactone there is used, 3-p-tolyl-3-vinyl propiolactone, and in place of triethylaluminum there is used tri-n-heptyl aluminum; 3-p-tolyl-3-vinyl capric acid is recovered.

EXAMPLE IV

The procedure of Example II is followed, except that instead of 3-phenyl-3-isopropyl propiolactone there is used 3-cyclo-hexyl-3-benzyl propiolactone; 3-cyclohexyl-3-benzyl valeric acid is recovered.

I have found the reaction to be of general applicability to 3,3-disubstituted propiolactones where the 3 position substituents are of monovalent hydrocarbon radicals including such groups as alkyl, aryl, alkaryl, alkenyl, cycloalkyl and aralkyl. Use of triethylaluminum will result in formation of the corresponding 3,3-disubstituted valeric acid, while other trialkylaluminum compounds will produce other 3,3-disubstituted acids. Although the triethyl compound is presently preferred because of its availability, the trialkyl compound can contain up to about 10 carbons per alkyl group, and can be either branched or straight chain. I presently prefer that all alkyls of the trialkylaluminum be the same, since use of a compound such as diethyl-i-butyl aluminum produces a mixed acid product, although this is also within the scope of my invention. As to the 3,3-disubstituted propiolactone, the only limitations when both $R_1$ and $R_2$ are alkyl are availability and ability to find a suitable solvent. However, when either $R_1$ or $R_2$ contains a ring structure, i.e., when either of $R_1$ or $R_2$ is selected from the group consisting of aryl, alkaryl, aralkyl and cycloalkyl, I then prefer that the total carbons in both substituents be at most about 15, and that the other substituent be selected from either alkyl or alkenyl. Examples of systems suitable for practice of my invention are as follows: triethylaluminum plus 3,3-dimethyl-$\beta$-propiolactone, tri-n-hexylaluminum plus 3-ethyl-3-n-octadecyl-$\beta$-propiolactone, diethyl-n-decylaluminum plus 3-n-butyl-3-i-amyl-$\beta$-propiolactone, n-propyl-di-n-hexylaluminum plus 3-phenyl-3-n-nonyl-$\beta$-propiolactone, tri-i-butylaluminum plus 3-benzyl-3-i-octyl-$\beta$-propiolactone, tri-n-decylaluminum plus 3-vinyl-3-cyclohexyl-$\beta$-propiolactone, ethyl-di-i-butylaluminum plus 3-p-tolyl-3-n-propyl-$\beta$-propiolactone, i-hexyl-di-i-propylaluminum plus 3-o-tolyl-3-allyl-$\beta$-propiolactone, triethylaluminum plus 3-cyclopentyl-3-n-decyl-$\beta$-propiolactone, and tri-i-butyl-aluminum plus 3-phenyl-3-n-hexyl-$\beta$-propiolactone.

The reaction between the lactone and the trialkylaluminum is preferably carried out in an inert solvent or diluent for the reactants, such as, e.g., toluene, xylene, benzene, heptane, hexane, isooctane or kerosene. Reaction pressure need only be sufficient to maintain liquid phase, and atmospheric pressure usually suffices, depending on choice of solvent or diluent. The reactants are preferably maintained under an inert atmosphere such as nitrogen or helium in order to prevent oxidation of the trialkylaluminum.

The reaction is preferably carried out between about $-80°$ C. and $100°$ C., and more preferably between about $-80°$ C. and $0°$ C. Although the lactone is preferably added to the trialkylaluminum, the reverse addition is also operable. Rate of addition need be controlled only to maintain reaction temperature within the desired range, since the reaction proceeds rapidly. Stirring of the reactants is preferred in order to ensure intimate contact. Although I do not believe the ratio of lactone to trialkylaluminum to be critical, I generally prefer to use about equi-molar quantities.

The crude reaction product, which comprises the carboxylic acid aluminum salt together with any unreacted starting material in the solvent or diluent, can be treated in known manner for recovery of the purified acid product. For example, the acid salt can first be hydrolyzed by adding a mineral acid such as hydrochloric or sulfuric acid. The carboxylic acid thus formed can then be extracted from the organic reaction product phase by contact with a solvent for the carboxylic acid which is immiscible with the crude product phase, such as an aqueous alkali metal hydroxide solution, e.g. aqueous NaOH. After phase separation, the aqueous phase contains the corresponding alkali metal salt of the carboxylic acid. The aqueous salt solution can then be evaporated to dryness, or alternatively, again hydrolyzed to the corresponding carboxylic acid by addition of mineral acid. Extraction of the resulting aqueous carboxylic acid solution with an immiscible solvent for the carboxylic acid, such as ether or a liquid paraffin, results in an organic solution of the desired carboxylic acid.

Having thus described the invention by providing specific examples thereof, it is to be understood that no undue limitations or restrictions are to be drawn by reason thereof, and that many variations and modifications are within the scope of the invention.

I claim:
1. A method of preparing a 3,3-disubstituted carboxylic acid in which the 3 position substituents are monovalent hydrocarbon radicals, which method comprises reacting trialkylaluminum with a 3,3-disubstituted propiolactone in which the 3 position substituents are monovalent hydrocarbon radicals in liquid phase and at a temperature in the range of $-80°$ to $+100°$ C., thereby forming a dialkylaluminum salt of the corresponding 3,3-disubstituted carboxylic acid; and then hydrolyzing the aluminum salt to the 3,3-disubstituted carboxylic acid.

2. The method claimed in claim 1 wherein the hydrolytic agent is sulfuric acid.

3. A method of preparing a compound of the structural formula $R_1R_2R_3C$—$CH_2$—$COOH$, wherein each of $R_1$ and $R_2$ is selected from the group consisting of alkyl, aryl, aralkyl, alkaryl, alkenyl and cycloalkyl and $R_3$ is an alkyl radical, which method comprises contacting a compound of the formula

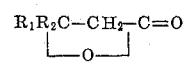

with trialkylaluminum under conditions of temperature in the range $-80°$ to $+100°$ C. and pressure to maintain reactants in liquid phase and effective to produce the corresponding di-hydrocarbon aluminum salt of the acid, hydrolyzing said aluminum salt, and recovering from the reaction mixture the thus-produced acid.

4. The method of claim 3 wherein each alkyl of the trialkylaluminum contains from 2 to about 10 carbons.

5. The method of claim 3 wherein the trialkylaluminum is triethylaluminum.

6. The method of claim 5 wherein $R_1$ and $R_2$ are each ethyl.

7. The method of preparing a 3,3-disubstituted carboxylic acid which comprises contacting in a solvent therefor trialkylaluminum with a 3,3-disubstituted $\beta$-propiolactone, each of the substituents being selected from the group consisting of alkyl, aryl, aralkyl, alkaryl, alkenyl, and cycloalkyl, at a temperature between about $-80°$ and about $0°$ C. under pressure sufficient to maintain liquid phase and in the presence of an inert atmosphere, hydrolyzing the crude reaction product with a mineral acid, extracting the acid as its salt by contacting the hydrolyzed crude reaction product with aqueous alkali metal hydroxide, hydrolyzing the extracted alkali metal acid salt with a mineral acid, extracting the hydrolyzed acid with a solvent therefor, and recovering the resulting acid from the solvent.

8. The method of claim 7 wherein each of said substituents is methyl and the trialkylaluminum is triethylaluminum.

References Cited by the Examiner

FOREIGN PATENTS 883,375  11/1961  Great Britain.

OTHER REFERENCES

Adams et al.: Organic Reactions, vol. VIII, New York, John Wiley and Sons, 1954, pp. 322–323, 342, 350–352.

LORRAINE A. WEINBERGER, *Primary Examiner.*

T. L. GALLOWAY, *Assistant Examiner.*